United States Patent
Yu

(10) Patent No.: US 8,876,317 B2
(45) Date of Patent: Nov. 4, 2014

(54) PROTECTION COVER AND BACKLIGHT MODULE

(71) Applicant: Ya-jun Yu, Shenzhen (CN)

(72) Inventor: Ya-jun Yu, Shenzhen (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 37 days.

(21) Appl. No.: 13/703,083

(22) PCT Filed: Sep. 25, 2012

(86) PCT No.: PCT/CN2012/081910
§ 371 (c)(1),
(2), (4) Date: Dec. 10, 2012

(87) PCT Pub. No.: WO2014/043925
PCT Pub. Date: Mar. 27, 2014

(65) Prior Publication Data
US 2014/0085863 A1    Mar. 27, 2014

(30) Foreign Application Priority Data

Sep. 24, 2012  (CN) .......................... 2012 1 0357828

(51) Int. Cl.
*G09F 13/04*  (2006.01)
*F28F 3/02*  (2006.01)
*F21V 29/00*  (2006.01)

(52) U.S. Cl.
CPC . *F21V 29/22* (2013.01); *F28F 3/02* (2013.01); *G09F 13/04* (2013.01)
USPC .......................................... 362/97.1; 362/633

(58) Field of Classification Search
USPC ....................... 362/97.1, 633, 634; 165/59, 67
See application file for complete search history.

(56) References Cited

U.S. PATENT DOCUMENTS

| | | | |
|---|---|---|---|
| 6,304,443 B1* | 10/2001 | Chou | 361/695 |
| 2008/0316699 A1* | 12/2008 | Chen et al. | 361/686 |
| 2010/0066946 A1* | 3/2010 | Song et al. | 349/64 |
| 2011/0013392 A1* | 1/2011 | Little, Jr. | 362/235 |
| 2011/0157822 A1* | 6/2011 | Wu et al. | 361/695 |
| 2013/0330961 A1* | 12/2013 | Peng et al. | 439/485 |

* cited by examiner

*Primary Examiner* — Evan Dzierzynski
(74) *Attorney, Agent, or Firm* — Kirton McConkie; Evan R. Witt

(57) ABSTRACT

The present invention provides a protection cover and a backlight module. The protection cover comprises a cover main body. The cover main body includes a heat dissipation surface. Each side edge of the cover main body forms a sidewall protruding with respect to the heat dissipation surface. The heat dissipation surface disposes at least one heat dissipation hole thereon, and the sidewall disposes at least one vent hole thereon. The present invention may timely and fast dissipate the heat in the protection cover, and improve the heat dissipation efficiency.

11 Claims, 1 Drawing Sheet

PROTECTION COVER AND BACKLIGHT MODULE

BACKGROUND OF THE INVENTION

1. Field of the Invention

The present invention relates to a display panel manufacturing technology field, and more particularly to a protection cover and a backlight module.

2. Description of the Prior Art

With the continuous popular of a display panel, the demand for the function of every component of the display panel becomes more and more high.

For a backlight module, the backlight module generally disposes some components, such as a PCB board. These components are often fragile, so they are easy to damage under the case of external disturbance or external touch, and further influence the normal work of the backlight module.

In order to protect these components, the prior art disposes a protection cover to cover the components. For example, please refer to FIG. 1, FIG. 1 is a structure schematic view of the protection cover.

The protection cover 10 comprises a top plate 11 and a side wall 12. Wherein in order to assure the heat dissipation effect of the components covered by the protection cover 10, the top plate 11 disposes a number of heat dissipation holes 111 thereon. The heat generated by the components passes through the heat dissipation holes to be dissipated, so that assuring the normal operation of the components.

But during the course of the actual operation, because the components produces more heat, the heat dissipation way of disposing the heat dissipation holes 111 on the top plate 11 often starts to dissipate heat only when a large amount of heat is gathered in the protection cover 10, and can not timely dissipate the heat produced by the components. The gathered heat will result in the damage of the components, and further influence the normal operation of the backlight module.

Hence, how to timely and fast dissipate the heat in the protection cover, improve the heat dissipation efficiency of the protection cover, avoid the damage of the components and assure the normal operation of the backlight module, is one of research directions of the display panel manufacturing technology field.

BRIEF SUMMARY OF THE INVENTION

One object of the present invention is to provide a protection cover to timely and fast dissipate the heat therein, improve the heat dissipation efficiency of the protection cover, avoid the damage of the components, and assure the normal operation of the backlight module.

For obtaining above beneficial effect, the present invention provides a protection cover, comprising a cover main body. The cover main body includes a heat dissipation surface. Each side edge of the cover main body forms a sidewall protruding with respect to the heat dissipation surface. The sidewall and the cover main body are integrally formed. The protection cover further comprises a positioning bar.

The heat dissipation surface disposes at least one heat dissipation hole thereon, and the sidewall disposes at least one vent hole thereon.

In one embodiment of the present invention, the at least one vent hole on the sidewall is arranged in equal space along an extending direction of the corresponding side edge of the protection main body.

In one embodiment of the present invention, the vent hole has a first diameter, the heat dissipation hole has a second diameter, and the first diameter is larger than or equal to the second diameter.

In one embodiment of the present invention, the positioning bar is formed by at least twice bending the side edge portion of the cover main body, a surface of the positioning bar is parallel to the heat dissipation surface, and an end of the sidewall is aligned with the surface of the positioning bar.

Another object of the present invention is to provide a protection cover to timely and fast dissipate the heat therein, improve the heat dissipation efficiency of the protection cover, avoid the damage of the components, and assure the normal operation of the backlight module.

For obtaining above beneficial effect, the present invention provides a protection cover, comprising a cover main body. The cover main body includes a heat dissipation surface. Each side edge of the cover main body forms a sidewall protruding with respect to the heat dissipation surface.

The heat dissipation surface disposes at least one heat dissipation hole thereon, and the sidewall disposes at least one vent hole thereon.

In one embodiment of the present invention, the sidewall protrudes from the cover main body, and is integrally formed with the cover main body.

In one embodiment of the present invention, the at least one vent hole on the sidewall is arranged in equal space along an extending direction of the corresponding side edge of the protection main body.

In one embodiment of the present invention, the vent hole has a first diameter, the heat dissipation hole has a second diameter, and the first diameter is larger than or equal to the second diameter.

In one embodiment of the present invention, the protection cover further comprises a positioning bar, the positioning bar is formed by at least twice bending the side edge portion of the cover main body, a surface of the positioning bar is parallel to the heat dissipation surface, and an end of the sidewall is aligned with the surface of the positioning bar.

The other object of the present invention is to provide a backlight module to timely and fast dissipate the heat therein, improve the heat dissipation efficiency of a protection cover, avoid the damage of the components, and assure the normal operation of the backlight module.

For obtaining above beneficial effect, the present invention provides a backlight module, comprising a component, which is covered by a protection cover. The protection cover comprises a cover main body. The cover main body includes a heat dissipation surface. Each side edge of the cover main body forms a sidewall protruding with respect to the heat dissipation surface.

The heat dissipation surface disposes at least one heat dissipation hole thereon, and the sidewall disposes at least one vent hole thereon.

In one embodiment of the present invention, the sidewall protrudes from the cover main body, and is integrally formed with the cover main body.

In one embodiment of the present invention, the at least one vent hole on the sidewall is arranged in equal space along an extending direction of the corresponding side edge of the protection main body.

In one embodiment of the present invention, the vent hole has a first diameter, the heat dissipation hole has a second diameter, and the first diameter is larger than or equal to the second diameter.

In one embodiment of the present invention, the protection cover further comprises a positioning bar, the positioning bar is formed by at least twice bending the side edge portion of the cover main body, a surface of the positioning bar is parallel to the heat dissipation surface, and an end of the sidewall is aligned with the surface of the positioning bar.

Comparing with the prior art, the present invention disposes at least one vent hole on the sidewall of the protection cover. The vent hole and the heat dissipation hole of the heat dissipation surface may form effective air convection to timely and fast dissipate the heat within the protection cover, improve the heat dissipation efficiency, avoid the damage of the components within the protection cover, and assure the work efficiency of the backlight module.

For more clearly and easily understanding above content of the present invention, the following text will take a preferred embodiment of the present invention with reference to the accompanying drawings for detail description as follows.

DETAILED DESCRIPTION OF THE PREFERRED EMBODIMENTS

Figure 1:
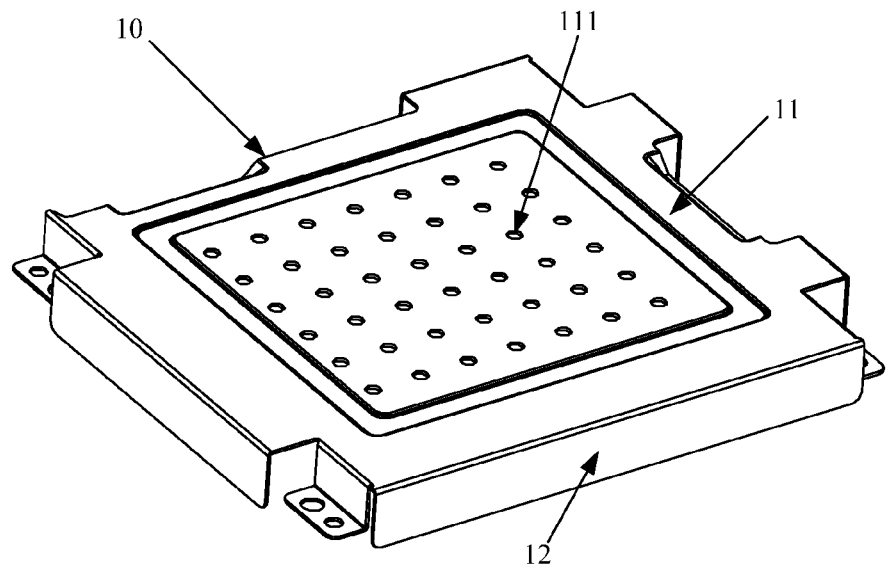
FIG. 1 is a structure schematic view of a protection cover in the prior art.

The following description of every embodiment with reference to the accompanying drawings is used to exemplify a specific embodiment, which may be carried out in the present invention. Directional terms mentioned in the present invention, such as "top", "bottom", "front", "back", "left", "right", "inner", "outer", "side" etc., are only used with reference to the orientation of the accompanying drawings. Therefore, the used directional terms are intended to illustrate, but not to limit, the present invention. In the drawings, the components having similar structures are denoted by the same numerals.

Figure 2:
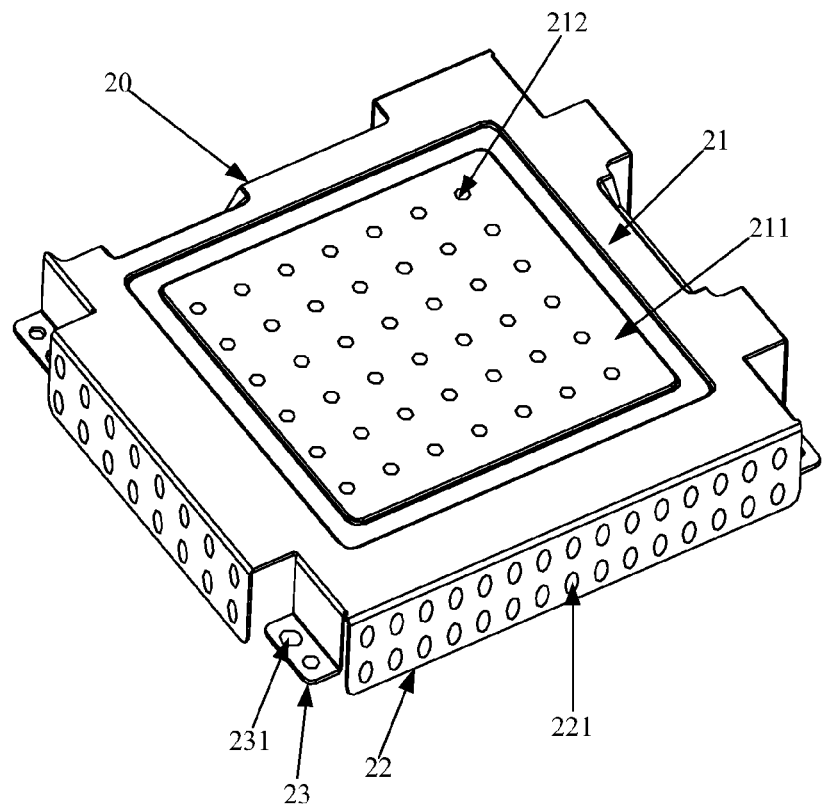
FIG. 2 is a structure schematic view of a protection cover of the present invention.

Please refer to FIG. 2, FIG. 2 is a structure schematic view of a preferred embodiment of a protection cover provided by the present invention.

The protection cover 20 comprises a cover main body 21. The cover main body 21 disposes a heat dissipation surface 211. Each side edge of the cover main body 21 forms a sidewall 22 protruding with respect to the heat dissipation surface 211, wherein the sidewall 22 is fixedly connected to the cover main body 21.

For one preferred embodiment of the present invention, the sidewall 22 is integrally formed with the cover main body 21, and is formed by protruding from each side edge of the cover main body 21 with respect to the heat dissipation surface 211. Certainly, in the specific implementation, the sidewall 22 also may be fixedly connected to the cover main body 21 by other ways, such as welding and so on, which are all within the protection scope of the present invention. Here is no listed one by one.

In the embodiment, the heat dissipation surface 211 disposes at least one heat dissipation hole 212, and each sidewall 22 disposes at least one vent hole 221. The at least one vent hole 22 is arranged in equal space along an extending direction of the corresponding side edge of the protection main body 21.

In the specific implementation, the vent hole 221 has a first diameter, the heat dissipation hole 212 has a second diameter, and the first diameter is larger than or equal to the second diameter. Depending on the first diameter of the vent hole 221 being larger than or equal to the second diameter of the heat dissipation hole 212, the present invention may assure the volume of air with low temperature entering into the protection cover 20, and make the volume of the low temperature air be greater than that of the volume of the high temperature air, thereby assuring a relatively low temperature within the protection cover 20.

The protection cover 20 also comprises a positioning bar 23. The positioning bar 23 is formed by at least twice bending the side edge portion of the cover main body 21. A surface of the positioning bar 23 is parallel to the heat dissipation surface 21. The positioning bar 23 disposes a positioning hole 231, and a backlight module disposes a screw hole (not shown in drawings) corresponding to the positioning hole 231. Whereby the protection cover 20 is fixed on the backlight module, and covers the corresponding components to protect the components to avoid the external damage.

Moreover, in the present invention, an end of the sidewall 22 is aligned with the surface of the positioning bar 23. By this way, the positioning bar 23 is fixed on the backlight module, thereby assuring that the sidewall 22 can provide the components with a better sealing effect, and may well protect the corresponding components.

The work principle of the protection cover 20 provided by the present invention is as follows:

Please refer to FIG. 2, the protection cover 20 covers the components, such as a PCB board, on the backlight module. The protection cover 20 is fixedly connected to the backlight module by the positioning bar 23. Because the end of the sidewall 22 is parallel to the surface of the positioning bar 23, the components may be well sealed within the protection cover 20.

During the operation of the components of the backlight module, it will produce a lot of heat. A lot of heat is transmitted to the air within the protection cover 20, and exists in a form of hot air. Within the protection cover 20, the hot air flows toward the heat dissipation hole 212 of the heat dissipation surface 211, and is transmitted out of the protection cover 20 from the heat dissipation hole 212.

But because the sidewall 22 of the protection cover 20 disposes the at least one vent hole 221, the external cold air not be effected by the heat will enter into the protection cover 20 through the vent hole 221. Therefore, the cold air entering into the protection cover 20 through the vent hole 221 and the hot air flowing out from the heat dissipation hole 212 form an effective convection, thereby accelerating to discharge the hot air through the heat dissipation hole 212, greatly improving the heat dissipation efficiency of the protection cover 20, assuring a relatively low temperature within the protection cover 20, avoiding the damage of the components within the protection cover 20 due to the high temperature, and further assure the normal working of the backlight module.

The present invention further provides a backlight module. The backlight module comprises the components, such as a PCB board, and the protection cover 20 covering the corresponding components to realize the protection of the components.

The protection cover 20 comprises the cover main body 21. The cover main body 21 disposes a heat dissipation surface 211. Each side edge of the cover main body 21 forms a sidewall 22 protruding with respect to the heat dissipation surface 211. Wherein the heat dissipation surface 211 disposes at least one heat dissipation hole 212, and the sidewall 22 disposes at least one vent hole 221. Because the protection cover 20 has been detail described in above text, no repeated herein.

The present invention disposes at least one vent hole on the sidewall of the protection cover. The vent hole and the heat dissipation hole of the heat dissipation surface may form the effective air convection to timely and fast dissipate the heat within the protection cover, improve the heat dissipation efficiency, avoid the damage of the components within the protection cover, and assure the work efficiency of the backlight module.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A protection cover, comprising a cover main body, the cover main body including a heat dissipation surface, each side edge of the cover main body forming a sidewall protruding with respect to the heat dissipation surface, the sidewall and the cover main body being integrally formed, the protection cover further comprising a positioning bar;

the heat dissipation surface disposing at least one heat dissipation hole thereon, and the sidewall disposing at least one vent hole thereon;

wherein the positioning bar is formed by at least twice bending the side edge portion of the cover main body, a surface of the positioning bar being parallel to the heat dissipation surface, and an end of the sidewall being aligned with the surface of the positioning bar.

2. The protection cover as claimed in claim 1, wherein the at least one vent hole on the sidewall is arranged in equal space along an extending direction of the corresponding side edge of the protection main body.

3. The protection cover as claimed in claim 1, wherein the vent hole has a first diameter, the heat dissipation hole has a second diameter, and the first diameter is larger than or equal to the second diameter.

4. A protection cover, comprising a cover main body, the cover main body including a heat dissipation surface, each side edge of the cover main body forming a sidewall protruding with respect to the heat dissipation surface;

the heat dissipation surface disposing at least one heat dissipation hole thereon, and the sidewall disposing at least one vent hole thereon;

wherein the protection cover further comprises a positioning bar, which is formed by at least twice bending the side edge portion of the cover main body; a surface of the positioning bar being parallel to the heat dissipation surface, and an end of the sidewall being aligned with the surface of the positioning bar.

5. The protection cover as claimed in claim 4, wherein the sidewall protrudes from the cover main body, and is integrally formed with the cover main body.

6. The protection cover as claimed in claim 4, wherein the at least one vent hole on the sidewall is arranged in equal space along an extending direction of the corresponding side edge of the protection main body.

7. The protection cover as claimed in claim 4, wherein the vent hole has a first diameter, the heat dissipation hole has a second diameter, and the first diameter is larger than or equal to the second diameter.

8. A backlight module, comprising a component, which is covered by a protection cover, the protection cover comprising a cover main body, the cover main body including a heat dissipation surface, each side edge of the cover main body forming a sidewall protruding with respect to the heat dissipation surface;

the heat dissipation surface disposing at least one heat dissipation hole thereon, and the sidewall disposing at least one vent hole thereon;

wherein the protection cover further comprises a positioning bar, which is formed by at least twice bending the side edge portion of the cover main body; a surface of the positioning bar being parallel to the heat dissipation surface, and an end of the sidewall being aligned with the surface of the positioning bar.

9. The backlight module as claimed in claim 8, wherein the sidewall protrudes from the cover main body, and is integrally formed with the cover main body.

10. The backlight module as claimed in claim 8, wherein the at least one vent hole on the sidewall is arranged in equal space along an extending direction of the corresponding side edge of the protection main body.

11. The backlight module as claimed in claim 8, wherein the vent hole has a first diameter, the heat dissipation hole has a second diameter, and the first diameter is larger than or equal to the second diameter.

* * * * *